United States Patent
Wagner et al.

(10) Patent No.: US 8,714,006 B2
(45) Date of Patent: May 6, 2014

(54) SENSOR DEVICE FOR MEASURING A DIRECTION OF INCIDENT FLOW AND EVALUATION DEVICE THEREFOR

(75) Inventors: Hannes Wagner, Braunschweig (DE); Fabian Kluessendorf, Braunschweig (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 183 days.

(21) Appl. No.: 13/307,102

(22) Filed: Nov. 30, 2011

(65) Prior Publication Data
US 2012/0137765 A1 Jun. 7, 2012

(30) Foreign Application Priority Data
Dec. 1, 2010 (DE) .......................... 10 2010 052 905

(51) Int. Cl.
*G01P 13/00* (2006.01)
(52) U.S. Cl.
USPC ...................................................... 73/170.02
(58) Field of Classification Search
USPC .......................................... 73/170.02–170.14
See application file for complete search history.

(56) References Cited

U.S. PATENT DOCUMENTS

| 4,817,426 | A * | 4/1989 | Igenbergs et al. ................ 73/180 |
| 4,942,763 | A * | 7/1990 | Harpster ....................... 73/202.5 |
| 6,038,932 | A * | 3/2000 | Wandel et al. ............. 73/861.65 |
| 7,155,969 | B2 * | 1/2007 | Drutowski et al. ........ 73/170.14 |
| 2003/0066762 | A1 * | 4/2003 | Friedenberger et al. ...... 205/775 |
| 2004/0045370 | A1 * | 3/2004 | Lenzing et al. ............ 73/861.52 |
| 2010/0318303 | A1 * | 12/2010 | Lucks ............................ 702/35 |
| 2011/0277447 | A1 * | 11/2011 | Sturmer ........................ 60/224 |
| 2012/0312932 | A1 * | 12/2012 | Hue et al. ...................... 244/214 |

FOREIGN PATENT DOCUMENTS

| DE | 35 00 988 | 2/1986 |
| GB | 2 274 170 | 7/1994 |
| WO | WO 88/03272 | 5/1988 |

* cited by examiner

*Primary Examiner* — Andre Allen
(74) *Attorney, Agent, or Firm* — Whitman Curtis Christofferson & Cook, PC

(57) ABSTRACT

The invention relates to a sensor device (4) for measuring a direction of incident flow (2) with which a flowing medium flows against the sensor device (4), having a flow body (1) which is set up to have the flowing medium flow around it, the flow body (1) having a plurality of pressure-sensitive or force-sensitive sensor elements (3) which are arranged on the outer surface of the flow body (1) or are arranged in the flow body (1) and are connected to the outer surface of the flow body (1), and the sensor elements (3) being arranged behind one another along the intended course (30) of the flow around the flow body (1). The invention also relates to an evaluation device for such a sensor device.

14 Claims, 8 Drawing Sheets

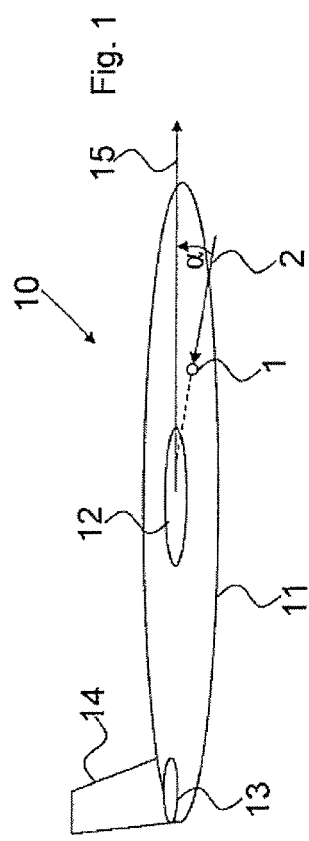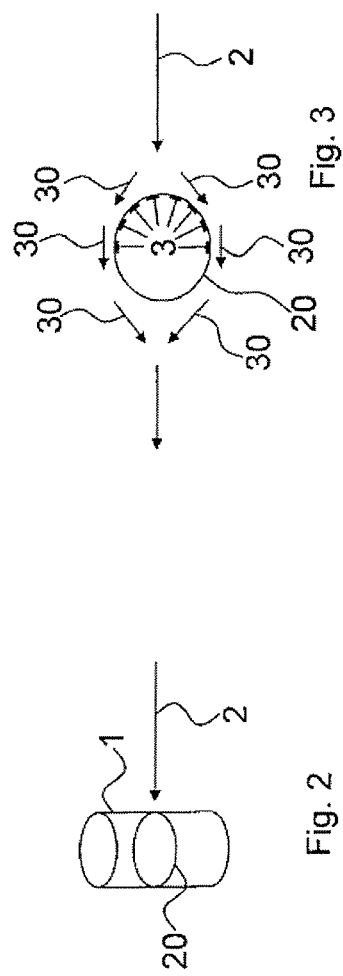

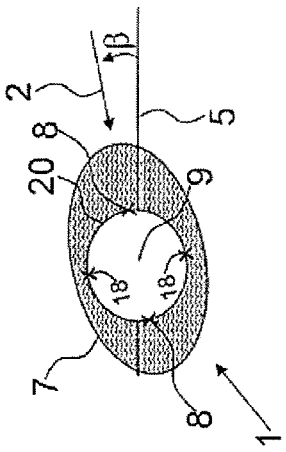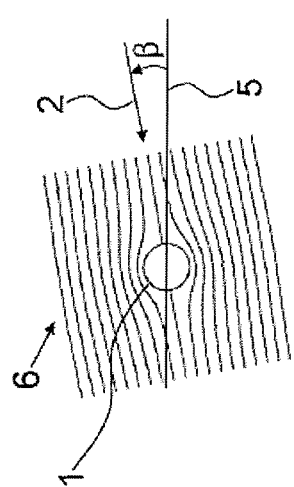
Fig. 9
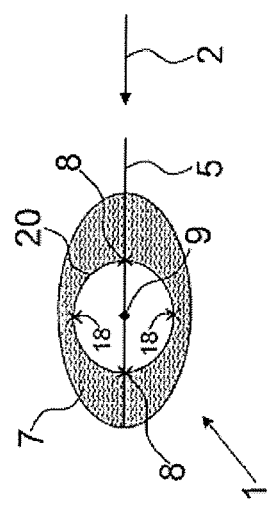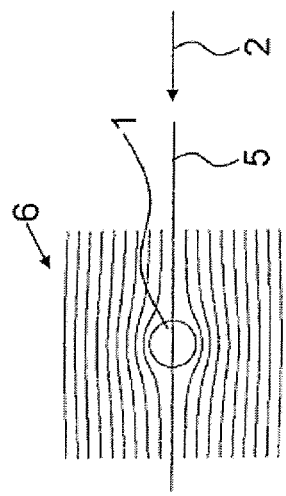
Fig. 10

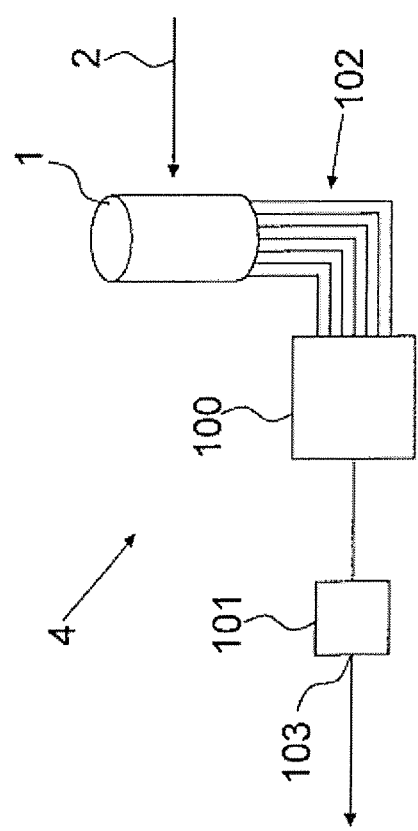

SENSOR DEVICE FOR MEASURING A DIRECTION OF INCIDENT FLOW AND EVALUATION DEVICE THEREFOR

BACKGROUND OF THE INVENTION

1. Field of the Invention

The invention relates to a sensor device for measuring a direction of incident flow against the sensor device, having a flow body which is set up to have the flowing medium flow around it. The invention also relates to an evaluation device for such a sensor device that is set up to use the sensor data generated by the sensor elements to determine a value of the direction of incident flow with which a flowing medium flows against the sensor device while computationally including the flow characteristics of the flow body.

2. Background Description

In different areas of engineering, it is necessary to determine a direction of incident flow with which a flowing medium flows against an object. Sensor devices which can be used to measure the direction of incident flow or an angle of incident flow with respect to a reference direction are known for this purpose. Fields of use include, for example, aviation, weather detection or detection of the flow conditions of hydraulic media. In the field of aviation, there are so-called incident flow angle sensors which are also referred to as angle of attack (AOA) sensors and are needed, for example, to measure the angle of attack of an airplane. Their usual design involves a rotary transducer, for example a potentiometer, being provided with a wind vane. In this case, the wind vane is arranged outside the airplane. The signal emitted by the potentiometer is influenced by the angle of rotation of the wind vane, with the result that the direction of incident flow can be determined therefrom.

The previously described incident flow angle sensor has a relatively complicated and expensive structure. In addition, the wind vane is sensitive to damage and is also sluggish owing to the principle.

SUMMARY OF THE INVENTION

Therefore, the invention is based on the object of specifying a simple and cost-effective sensor device which can be robustly implemented. The intention is also to specify an evaluation device suitable therefor.

This object is achieved by the invention of a sensor device for measuring a direction of incident flow against the sensor device, having a flow body which is set up to have the flowing medium flow around it and an evaluation device for such a sensor device that is set up to use the sensor data generated by the sensor elements to determine a value of the direction of incident flow with which a flowing medium flows against the sensor device while computationally including the flow characteristics of the flow body.

The invention has the advantage that it is possible to use simple and cost-effective sensor elements, for example miniaturized pressure sensors or force sensors available on the market. Possible sensor elements are pressure sensors or force sensors based on all physical principles known for this purpose.

The sensor device according to the invention is suitable for all types of flowing media, for example air and other gases, hydraulic media, such as water and oil, as well as for aggressive and corrosive media.

Another advantage is that no components which have to be mechanically moved by the flowing medium, such as the wind vane, have to be provided in the sensor device according to the invention. As a result, the sensor device may be very robust and insensitive to damage. In addition, the sensor device may be more compact and more wear-resistant than known sensor devices. The measurement also takes place directly on the surface.

In this case, the sensor device has a flow body which is intended to have the flowing medium flow around it. A plurality of sensor elements are provided along the intended course of the flow around the flow body and are arranged behind one another along the course of the flow around the body. This allows the direction of incident flow of the flowing medium to be measured by evaluating the sensor data from the plurality of sensor elements. The resolution and measurement accuracy for measuring the direction of incident flow increase, in principle, with the number or density of sensor elements per unit area. The resolution and measurement accuracy can be additionally increased by interpolating sensor data from two adjacent sensor elements. This also makes it possible to measure intermediate values of the direction of incident flow which do not exactly correspond to the position of the sensor elements on the flow body.

Another advantage is that the direction of incident flow can also be measured in a more accurate manner over time than in known wind vane incident flow angulometers. Since the wind vane is bulky, the direction of flow is detected with a certain mass-related inertia. In addition, oscillation movements may result, depending on the damping of the rotational movement of the wind vane. Such disadvantages may also be overcome with the sensor device according to the invention.

The plurality of sensor elements allows the determination of a pressure distribution around the flow body in the direction of the course of the flow around the body. In this case, the flow body can be completely or only partially occupied by the sensor elements along the intended course of the flow around the body. Complete occupation makes it possible to detect any desired directions of incident flow, that is to say from all directions surrounding the flow body. Depending on the application, partial occupation by the sensor elements may also be expedient. For applications in aviation in which the sensor device is intended to be used to detect the angle of attack of an airplane, for example, a detection range of +/−30° generally suffices, with the result that occupation of the flow body over an angular range of 60° or 70° (+/−30° or +/−35° with respect to the flight direction) is also sufficient. Occupation around 180° may also be advantageous in particular airplanes, for example in military airplanes.

According to one advantageous development of the invention, one, more or all of the sensor elements are in the form of piezoresistive thin-film sensors. This has the advantage that such sensor elements are robust and not very sensitive to damage and also have a very flat construction, with the result that they can be readily arranged on the outer surface of the flow body without noticeably influencing the flow. Piezoresistive thin-film sensors are also highly sensitive to forces or pressures acting on them. Another advantage is that piezoresistive thin-film sensors can be produced in a very cost-effective manner.

According to one advantageous development of the invention, the thin-film sensors are produced by coating the outer surface of the flow body with the following layers:

a) at least one piezoresistive sensor layer formed with doped or undoped hydrocarbon or pure carbon on the outer surface of the flow body, b) at least one electrode applied to the piezoresistive sensor layer, and c) at least one insulation and wear protection layer which covers the piezoresistive sensor layer and the electrode.

According to one advantageous development of the invention, the sensor elements are arranged in at least two rows which are each offset with respect to one another along the intended course of the flow around the flow body. This makes it possible to increase the measurement resolution when the length of the sensor elements expands in the direction of flow around the body. In the case of two rows of sensor elements for example, one sensor element can thus be respectively arranged at the level of a gap between two sensor elements in an adjacent row of sensor elements. Further rows of sensor elements can be used to increase the measurement resolution further. In principle, the sensor device can also be implemented with only one row of sensor elements. However, the resolution can be increased by means of a plurality of rows with sensor elements which are offset with respect to one another.

In principle, any desired three-dimensional body can be used as the flow body. According to one advantageous development of the invention, parts of an object for which the direction of incident flow of the flowing medium can be detected are used as the flow body. When used in aviation, the leading-edge area of a wing can be used, for example, as the flow body. When using piezoresistive thin-film sensor elements, in particular, the sensor elements can be directly applied to the wing.

The flow body may also be in the form of an additional part. Shapes of the flow body which enable a favorable flow profile of the flowing medium, for example flow bodies with a circular cross section, an oval or elliptical cross section or any other cross section or with a typical streamline cross section, are advantageous, in particular. When using a circular cross section, it is advantageous to design the flow body in the form of a cylinder against which the medium flows from the side, that is to say onto the cylindrical wall surface of the cylinder.

Shapes of the flow body which allow the direction of incident flow to be detected from different or any desired spatial planes are also advantageous. The flow body may be spherical, for example, and may be occupied all round, on the outer surface, by, for example, hexagonal sensor elements which are arranged, for example, in a honeycomb pattern. This makes it possible to simultaneously measure two different components of the direction of incident flow, for example in two coordinate directions (for example x and y directions). When the sensor device is used in an airplane, it is possible to simultaneously determine the angle of attack and the drift angle of the airplane, for example.

According to one advantageous development of the invention, the sensor elements are connected to electrical contact points of the sensor device, which are arranged in a contact area of the sensor device, by means of electrical connecting lines which are guided through a sealing area of the sensor device. The contact area is set up not to come into contact with the flowing medium. This has the advantage that the sensor device can be easily installed in different fields of use. As a result of the sealing area which allows a certain distance between a contact area and the flow body, the sensor device can be installed, for example, in the fuselage wall of an aircraft or at the bottom of the hull of a ship. In this case, the contact area advantageously does not come into contact with the flowing medium, with the result that said contact area can be arranged in a protected manner. This makes it possible to protect the contact area from the ambient conditions prevailing outside. As a result, the sensor device is also suitable for flowing media which would be harmful to the electrical contact points. The sealing area may also be simultaneously used to accordingly seal the contact area with respect to the flow body coming into contact with the flowing medium, for example by means of an elastomer seal. As a result of the distance between the flow body and the contact area, which is enabled by the sealing area, the sensor device can be installed more easily in such a manner that the flowing medium flows around the flow body in a manner which is not influenced, as far as possible, by the installation means for the sensor device. It is also possible to ensure that the flow body is outside the boundary layer surrounding a missile. This has a positive effect on the measurement accuracy of the sensor device.

According to one advantageous development of the invention, the sensor device has one or more heating elements in the flow body, which element(s) can be used to set a desired operating temperature of the sensor device. This has the advantage that cooling effects which arise on account of the medium flowing past and possibly have locally different effects can be compensated for. As a result, the sensor device can be operated with the same measurement accuracy independently of temperature-dependent characteristics of the sensor elements. If a plurality of heating elements are provided, they can be regulated together. It is also advantageous to individually control or regulate the heating elements in such a manner that, in the event of a non-uniform temperature distribution in the sensor device, a homogenizing operation is effected by appropriately, individually controlling or regulating the heating elements. In addition, formation of ice can be avoided by means of the heating elements.

The heating elements may be in the form of heating coils or heating cartridges, for example.

According to one advantageous development of the invention, the heating element(s) is/are connected to a temperature regulator which is set up to keep the operating temperature of the sensor device constant.

According to one advantageous development of the invention, the heating element(s) is/are connected to a temperature regulator which is set up to keep the operating temperature of the sensor device so high that no ice can form on the flow body. This makes it possible to avoid ice formation, which is dangerous, in particular, in the field of aviation, under the respective conditions of use of the sensor device.

According to one advantageous development of the invention, at least one temperature sensor is provided in or on the flow body. According to one advantageous development of the invention, a temperature sensor is provided for each heating element and is arranged in the vicinity of the heating element. According to one advantageous development of the invention, the temperature sensors are arranged in this case on the outer surface of the flow body or at least close to the outer surface.

Another advantage is that the temperature sensors can carry out automatic temperature compensation for the sensor data generated by the sensor elements by measuring temperature values.

When the sensor device is used on an aircraft, provision may advantageously be made for the desired temperature of the temperature regulation to be adapted to the flight situation and/or to the ambient conditions.

According to one advantageous development of the invention, the sensor device is in the form of a device for measuring the angle of attack of an aircraft. The sensor device has a standardized interface, for example ARINC, which can be connected to the on-board computer of an aircraft. The current direction of incident flow can be transmitted via the interface as a measure of the angle of attack. This makes it possible to directly transmit the current direction of incident flow to the on-board computer of the aircraft.

According to one advantageous development of the invention, the sensor device is in the form of a device for measuring the drift angle of an aircraft. The sensor device has a standardized interface, for example ARINC, which can be connected to the on-board computer of an aircraft. The current direction of incident flow can be transmitted via the interface as a measure of the drift angle. This makes it possible to directly transmit the current direction of incident flow to the on-board computer of the aircraft.

The sensor device may also be advantageously in the form of a combined device for measuring the angle of attack/drift angle. In this case, two components of the direction of incident flow are detected by the sensor device, to be precise the direction of incident flow with respect to the transverse axis of the aircraft (according to the angle of attack) and the direction of incident flow with respect to the vertical axis of the aircraft (according to the drift angle). In this case, the two detected components of the direction of incident flow are then directly transmitted to the on-board computer of the aircraft.

According to one advantageous development of the invention, the sensor device has an evaluation device which is set up to use the sensor data generated by the sensor elements to determine the direction of incident flow with which a flowing medium flows against the sensor device. The evaluation device can be structurally integrated into the structural unit, which has the flow body, in the form of evaluation electronics or may be in the form of separate evaluation electronics. The evaluation device may advantageously also comprise the elements of the temperature regulator which is intended to control the heating elements.

The invention also relates to an evaluation device for a sensor device of the type described above. The evaluation device is set up to use the sensor data generated by the sensor elements to determine the direction of incident flow with which a flowing medium flows against the sensor device while computationally including the flow characteristics of the flow body. This has the advantage that the evaluation device can provide, as an output signal, corrected values of the direction of incident flow in which the properties of the flow body have already been taken into account. Different correction variables thus need to be taken into account in the case of a circular cross section of the flow body than in the case of an elliptical cross-sectional shape.

According to one advantageous development of the invention, the evaluation device is set up to use the sensor data generated by the sensor elements to determine the position of one or both pressure maxima on the outer surface of the flow body and to determine, as the value of the direction of incident flow, a straight line through the positions of the two highest pressure maxima and/or, as the value of the direction of incident flow, a straight line through the position of one of the two highest pressure maxima and the center of the cross-sectional area of the flow body in a section along the intended course of the flow around the flow body. The direction of incident flow can also be determined from the position of two pressure minima. The connecting line of the two pressure minima runs through the center of the circular cross section and is perpendicular to the direction of incident flow. A perpendicular to a straight line through the positions of the two pressure minima is determined therefrom as the value of the direction of incident flow. This perpendicular is directly a measure of the direction of incident flow in a flow body in the form of a circular cylinder. The pressure minima or maxima are determined by comparing the sensor data from the different sensor elements, the accuracy being able to be increased, if necessary, by interpolating between sensor data from two adjacent sensor elements. In the case of a circular cylinder, the respective pressure minima or maxima are usually on mutually opposite sides of the cylinder. Therefore, the value of the direction of incident flow can also be determined by determining one of the two pressure minima or maxima. The connecting line from the center of the circular cross section of the flow body to the pressure maximum points in the direction of incident flow.

Advantageous fields of use of the sensor device include aviation, for example as an angle of attack sensor, and meteorology, as a replacement for traditional wind vanes. A further field of use is wind power installations. Arranging sensor devices on the blades and blade tips of a wind power installation makes it possible to measure the flow field in which the wind power installation operates. This makes it possible to optimize the angle of attack of the blades depending on the incident flow, with the result that the efficiency of the wind power installation can be increased.

Another field of use of the sensor device lies in measuring a drift angle of an aircraft or ship.

Another field of use of the sensor device involves measuring the humidity. Additional information relating to the air pressure, the incident flow velocity of the flowing medium and the ambient temperature is required for this purpose. The humidity can be determined from this information and the electrical power which must be supplied to the heating elements in order to keep the operating temperature of the sensor device constant.

BRIEF DESCRIPTION OF THE DRAWINGS

The invention is explained in more detail below with reference to exemplary embodiments using drawings, in which:

FIG. 1 shows a side view of an airplane, and

FIG. 2 shows a perspective illustration of a flow body, and

FIG. 3 shows a view of the flow body according to FIG. 2 in a sectional illustration, FIGS. 9 and 10 show pressure distributions and flow patterns at flow bodies, and FIG. 11 shows another embodiment of a sensor device.

DETAILED DESCRIPTION THE INVENTION

Figure 4:
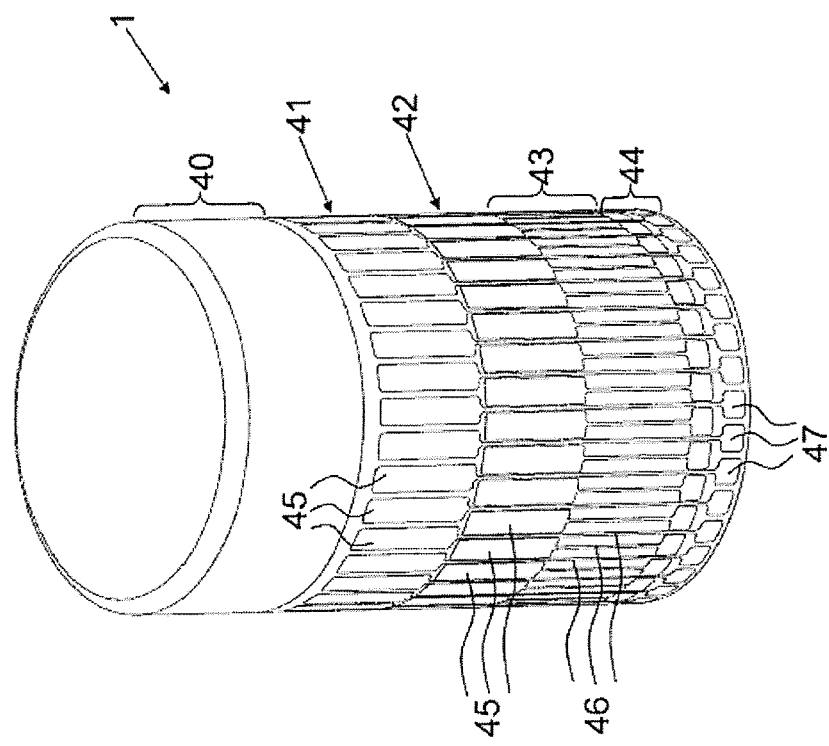
FIG. 4 shows a first view of a sensor device in a perspective illustration.

In the figures, the same reference symbols are used for elements which correspond to one another.

FIG. 1 shows an aircraft 10, for example an airplane, having a fuselage 11, a wing 12, a horizontal stabilizer 13 and a vertical stabilizer 14. The aircraft 10 moves in a flight direction 15. A sensor device for measuring the direction of incident flow 2 of the surrounding air is fitted to the fuselage 11 of the aircraft 10. The sensor device is guided through the fuselage wall, with the result that the part which is arranged on the outside and has a flow body 1 can be seen in FIG. 1. The surrounding air flows against the flow body 1 in a direction of incident flow 2. The direction of incident flow 2 is at an angle α to the flight direction 15, for example. In this case, the angle α corresponds to the angle of attack.

FIG. 2 shows, by way of example, a cylindrical flow body 1 against which a flowing medium flows in a direction of incident flow 2. A plane 20, that is to say a circular cross-sectional area of the cylindrical flow body 1, which is illustrated in a plan view in FIG. 3 is marked in FIG. 2. FIG. 3 is also used to illustrate in a simplified manner how the flowing medium flows around the flow body 1 along the cross-sectional area 20. A course 30 of the flow around the flow body, which results from the flow of the medium resulting from the direction of incident flow 2, is illustrated by means of a plurality of arrows. FIG. 3 also illustrates, by way of example, pressure-sensitive or force-sensitive sensor elements 3. As can be seen, the sensor elements 3 are arranged behind one another along the course 30 of the flow around the flow body, with the result that the individual particles of the flowing medium pass the sensor elements 3 in temporal succession. This produces a particular pressure profile in the direction 30 of flow around the flow body, which profile can be detected by the sensor elements 3.

FIG. 4 shows a flow body 1 of the sensor device, which body is substantially cylindrical. In the area illustrated at the top in FIG. 4, the flow body 1 has a terminating section 40 which terminates the flow body at one of its ends. The terminating section 40 is adjoined by a first row of sensor elements, outer electrodes 45 of which are illustrated in FIG. 4. The first row of sensor elements is adjoined by a second row 42 of sensor elements which are again represented by electrodes 45 in FIG. 4. The second row 42 of sensor elements is adjoined by a sealing area 43. Electrical connecting lines 46 are passed through the sealing area 43 from the electrodes 45 to electrical contact points 47 which are further down. The sealing area 43 is adjoined by a contact area in which the electrical contact points 47 are arranged. An evaluation device (not illustrated in FIG. 4), for example in the form of an electronic circuit, is connected to the contact points 47.

The electrodes 45 are formed, as thin layers, from an electrically conductive material, for example copper or silver. The electrodes 45 may be substantially rectangular, for example. Other shapes may also be advantageously implemented. As can be seen, the electrodes 45 in the first row 41 of sensor elements are arranged in such a manner that they are offset with respect to the electrodes 45 in the second row 42 of sensor elements. This makes it possible to double the resolution of the sensor device.

Figure 5:
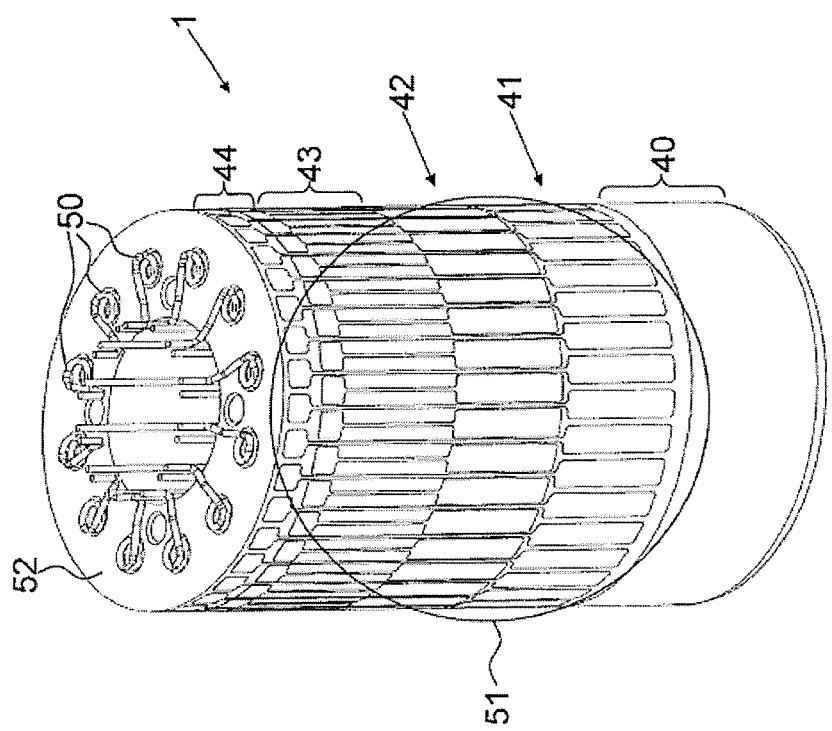
FIG. 5 shows a second view of the sensor device according to FIG. 4 in a perspective illustration.

FIG. 5 shows the sensor device 4 according to FIG. 4 in an upside-down view, that is to say the terminating section 40 is arranged at the bottom in this case. Said section is adjoined by the sections which have already been explained in connection with FIG. 4. It can be seen in FIG. 5 that heating elements 50 are provided inside a flow body 1 and are arranged in a manner distributed over the circumference of the flow body 1. The heating elements 50 have electrical connections which project from the underside of the flow body 1. The heating elements 50 are also explained below in connection with FIG. 7.

Figure 6:
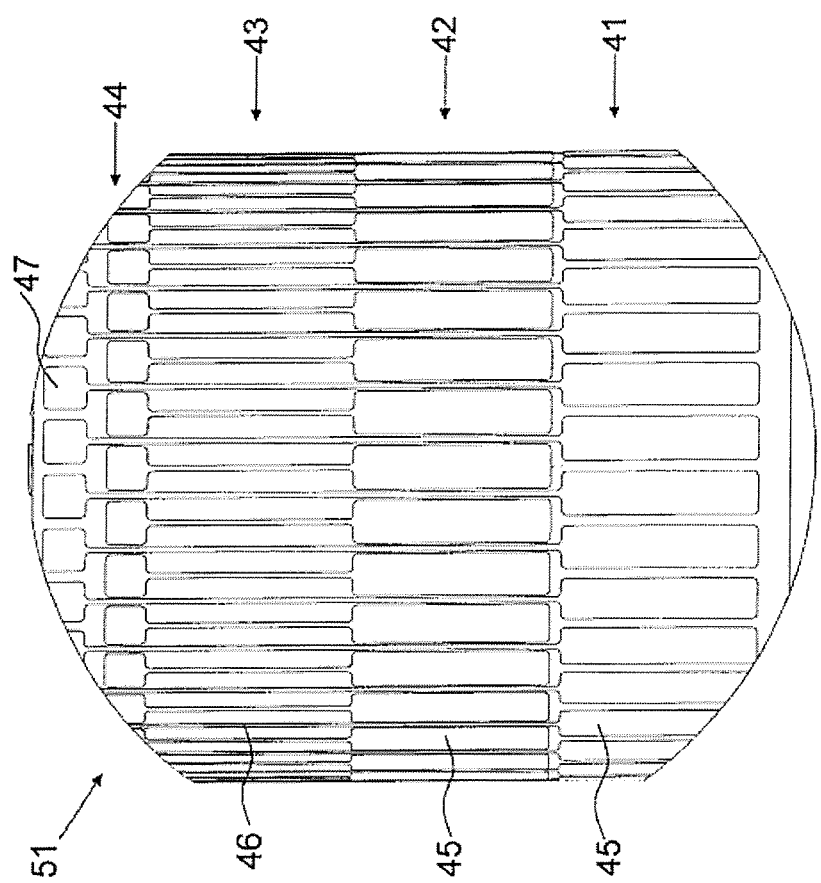
FIG. 6 shows an enlarged illustration of a detail of the outer structure of the sensor device according to FIGS. 4 and 5.

An area 51 is marked in FIG. 5. The area 51 is reproduced on an enlarged scale in FIG. 6 in order to illustrate the arrangement of the electrodes 45 and the electrical connecting lines 46. As can be seen in FIG. 6, the connecting lines 46 are guided through, as fine lines, from the electrodes 45 in the first row 41 between the electrodes 45 in the second row 42 and are then connected to the electrical contact points 47 in the contact area 44.

The electrodes 45, the electrical connecting lines 46 and the electrical contact points 47 may be in the form of conductor tracks, as are used in electrical printed circuit boards.

Figure 7:
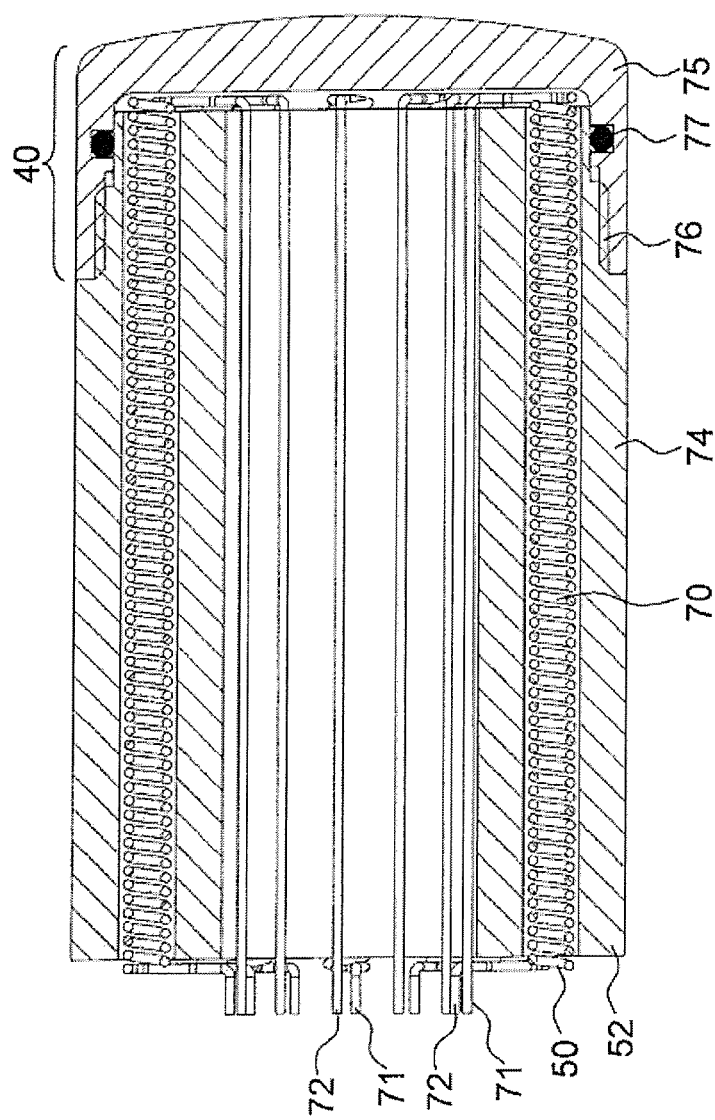
FIG. 7 shows a longitudinal section through the sensor device according to FIGS. 4 to 6.

FIG. 7 shows the flow body 1 according to FIGS. 4 to 6 in a section in the longitudinal direction. A housing part 52 which is produced from metal, for example, and has holes into which the heating elements 50 are inserted can be seen. The electrical connections of the heating elements 50 end in outer connection pieces 71, 72. The heating elements 50 may be formed, for example, from a heating wire 70 bent in the form of a coil. A terminating cap 75 comprising the terminating section 40 is placed onto the housing part 52, for example is screwed on using a thread 76. A sealing element 77 between the terminating cap 75 and the housing part 52 can also be seen. As previously described using FIGS. 4 to 6, the outside of the sensor body 52 is provided with the sensor elements 3. Temperature sensors needed to regulate the temperature using the heating elements 50 are advantageously placed in an area 74 of the housing part 52, that is to say inside the metal body, with the result that the temperature sensors can precisely detect the local temperatures, on the one hand, and are not influenced, as far as possible, by environmental influences and the medium flowing against them, on the other hand.

Figure 8:
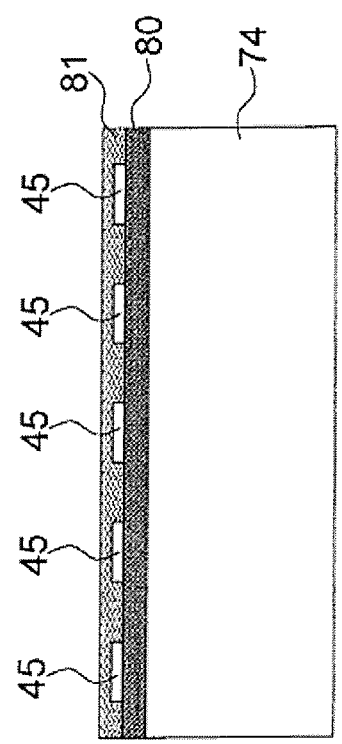
FIG. 8 shows a diagrammatic illustration of the structure of piezoresistive thin-film sensors in a sectional illustration.

FIG. 8 shows an exemplary structure of thin-film sensor elements. The sensor elements can be advantageously directly applied to a metal substrate by means of coating. The flow body 1, for example the outer surface of the housing part 52, can be directly used as the substrate. FIG. 8 shows a section of the area 74 of the housing part 52. A pressure-sensitive coating in the form of a piezoresistive sensor layer 80 formed with doped or undoped hydrocarbon or pure carbon is first of all arranged on the housing part 52. The electrodes 45 are applied to the piezoresistive sensor layer 80, five electrodes 45 being illustrated by way of example in FIG. 8. Finally, an insulation and wear protection layer 81 which covers the piezoresistive sensor layer 80 and the electrodes 45 is applied to said arrangement comprising the piezoresistive sensor layer and the electrodes.

Possible doping materials for the sensor layer 80 in the form of a doped hydrocarbon layer are, for example, metals such as tungsten, chromium, silver, titanium, gold, platinum etc. Pure or amorphous hydrocarbon layers are also possible as the material for the sensor layer 80.

The electrodes 45 consist of a thin metal layer, for example chromium, titanium, chromium/nickel compounds etc.

The insulation and wear protection layer 81 may be formed, for example, from a silicon-doped hydrocarbon layer. The use of silicon/oxygen-doped, aluminum-oxide-doped or aluminum-nitrite-doped hydrocarbon layers is also conceivable.

FIGS. 9 and 10 show the detection behavior of the sensor device 4 in a flow field 6 of a flowing medium. The arrow 2 is again used to indicate the direction of incident flow of the flowing medium. The line 5 represents a measurement reference of the sensor device, with respect to which an angular deviation of the direction of incident flow 2 is determined. FIG. 9 shows an example in which the direction of incident flow 2 runs exactly in the direction of the line 5. FIG. 10 shows an example in which the direction of incident flow 2 deviates from the line 5 by an angle $\beta$. The sensor device 4 is illustrated in the flow field 6 in each of the upper illustrations in FIGS. 9 and 10. Each of the lower illustrations reproduces the distribution of the pressure acting on the sensor device 4 through the flowing medium.

As can be seen at the bottom of FIG. 9, a pressure distribution 7 which has its maxima on the line 5 forms at the flow body 1 of the sensor device 4 as a result of its circular cross section. The positions 8 of the maxima are indicated using an "x". According to FIG. 9, the minima of the pressure distribution 7 can also be found again as it were above and below the line 5. The positions 18 of the minima are indicated using an "x". The positions 8 of the maxima are on respective opposite sides of the center 9 of the circular cross section 20 of the flow body 1. The positions 18 of the minima are likewise on respective opposite sides of the center 9 of the circular cross section 20 of the flow body 1.

It can be seen at the bottom of FIG. 10 that, as a result of the direction of incident flow 2 which has been changed by the angle β, with otherwise identical positioning of the sensor device 4 (same position of the line 5), the positions 8 of the maxima and the positions 18 of the minima are likewise rotated through the angle β. In order to determine the direction of incident flow 2 or the angle of incident flow β, the position 8 of the pressure maxima can therefore be determined in an evaluation device, a connecting line between the positions 8 can be formed and the angle between the connecting line and the line 5 can finally be formed. On account of the symmetrical distribution of the positions 8 with respect to the center 9, it is also sufficient to determine one position 8 and to form the connecting line using the center 9 and to determine the angle of incident flow β from the connecting line. The direction of incident flow 2 or the angle of incident flow β can likewise be determined from the positions 18 of the minima or at least from one position 18 and the center 9 by forming a perpendicular to the connecting line between the positions 18 or between one position 18 and the center 9 and finally determining the angle between the perpendicular and the line 5.

FIG. 11 shows a schematic illustration of another embodiment of a sensor device. A flow body 1, an evaluation device 100 and an interface module 101 can be seen. The flow body 1 is connected to the evaluation device 100 via a plurality of electrical lines 102. The electrical connection between the evaluation device 100 and the electrodes 45 of the sensor elements 3 and the electrical connections 71, 72 of the heating elements is established using the electrical lines 102. In addition, temperature sensors which are optionally provided are connected via the electrical lines 102. Furthermore, the electrical lines 102 comprise a connecting line which is used to connect the housing part 52, which is used as the substrate for the thin-film sensors, to the evaluation circuit 100. In this case, the substrate is used as a common reference potential for all electrodes 45.

The evaluation device 100 has, for example, a microprocessor which executes an evaluation program. The various electrodes 45 are connected to one or more analog/digital converter inputs of the microprocessor, if appropriate via multiplexers. In order to determine the sensor data from the sensor elements 3, the evaluation device 100 periodically measures the non-reactive resistance between the individual electrodes 45 and the substrate, that is to say the housing part 52. The sensor data are evaluated, for example according to the methods explained using FIGS. 9 and 10. The value of the direction of the incident flow 2 or of an associated angle of incident flow determined thereby is passed by the evaluation device 100 to an interface module 101 connected to the evaluation device 100. The interface module 101 converts the data into a standardized format which can be evaluated by other devices, for example ARINC. The interface device 101 then outputs the data on an output side 103.

The invention claimed is:

1. Sensor device for measuring a direction of incident flow with which a flowing medium flows against the sensor device, comprising:
    a flow body which is set up to have the flowing medium flow around it,
    the flow body having a plurality of pressure-sensitive or force-sensitive sensor elements in the form of piezoresistive thin-film sensors arranged on an outer surface of the flow body or are arranged in the flow body and are connected to the outer surface of the flow body,
    the sensor elements being arranged behind one another along the intended course of the flow of the flowing medium at least partially around the flow body, and
    an evaluation device which is set up to use the sensor data generated by the sensor elements to determine a value of the direction of incident flow with which a flowing medium flows against and around the sensor device.

2. Sensor device according to claim 1, wherein the sensor elements along the intended course of the flow around the flow body completely or partially surround the flow body.

3. Sensor device according to claim 1, wherein the thin-film sensors are produced by coating the outer surface of the flow body with the following layers:
   a) at least one piezoresistive sensor layer formed with doped or undoped hydrocarbon or pure carbon on the outer surface of the flow body,
   b) at least one electrode applied to the piezoresistive sensor layer, and
   c) at least one insulation and wear protection layer which covers the piezoresistive sensor layer and the electrode.

4. Sensor device according to claim 1, wherein the sensor elements are arranged in at least two rows which each run along the intended course of the flow around the flow body and are offset with respect to one another.

5. Sensor device according claim 1, wherein the flow body has a circular cross section.

6. Sensor device according to claim 1, wherein the sensor elements are connected to electrical contact points of the sensor device, which are arranged in a contact area of the sensor device, by means of electrical connecting lines which are guided through a sealing area of the sensor device, the contact area being set up not to come into contact with the flowing medium.

7. Sensor device according to claim 1, wherein the sensor device has one or more heating elements in the flow body, which element(s) can be used to set a desired operating temperature of the sensor device.

8. Sensor device according to claim 7, wherein the heating element(s) is/are connected to a temperature regulator which is set up to keep the operating temperature of the sensor device constant.

9. Sensor device according to claim 7, wherein the heating element(s) is/are connected to a temperature regulator which is set up to keep the operating temperature of the sensor device so high that no ice can form on the flow body.

10. Sensor device according to claim 1, wherein at least one temperature sensor is provided in or on the flow body.

11. Sensor device according to claim 1, wherein the sensor device is in the form of a device for measuring the angle of attack and/or a device for measuring the drift angle for an airplane and has a standardized interface which can be connected to an on-board computer of an airplane, the current measured direction of incident flow being able to be transmitted via the interface.

12. Sensor device according to claim 1, wherein the evaluation device is set up to use the sensor data generated by the sensor elements to determine a value of the direction of incident flow with which a flowing medium flows against the sensor device while computationally including the flow characteristics of the flow body.

13. Sensor device according to claim 12, wherein the evaluation device is set up to use the sensor data generated by the sensor elements determine the position of one or two pressure maxima on the outer surface of the flow body and to determine, as the value of the direction of incident flow, a straight line through the positions of the two pressure maxima and/or, as the value of the direction of incident flow, a straight line through the position of one pressure maximum and the center of the cross-sectional area of the flow body in a section along the intended course of the flow around the flow body.

14. Sensor device according to claim 12, wherein the evaluation device is set up to use the sensor data generated by the sensor elements to determine the position of one or two pressure minima on the outer surface of the flow body and to determine, as the value of the direction of incident flow, a perpendicular to a straight line through the positions of the two pressure minima and/or, as the value of the direction of incident flow, a perpendicular to a straight line through the position of one pressure minimum and the center of the cross-sectional area of the flow body in a section along the intended course of the flow around the flow body.

* * * * *